United States Patent [19]

Yim et al.

[11] 3,728,594

[45] Apr. 17, 1973

[54] ELECTROLUMINESCENT DEVICE COMPRISING A TRANSITION METAL OXIDE DOPED WITH A TRIVALENT RARE EARTH ELEMENT

[75] Inventors: Woongsoon Michael Yim; Perry Niel Yocom, both of Princeton, N.J.

[73] Assignee: RCA Corporation, New York, N.Y.

[22] Filed: Nov. 17, 1971

[21] Appl. No.: 199,708

[52] U.S. Cl. ....317/235 R, 317/235 N, 317/235 AQ, 313/108 D, 331/94.5, 65/30, 252/301.4 R

[51] Int. Cl. ....H05b 33/00

[58] Field of Search ....317/235 N, 235 AQ; 313/108 D, 108 A; 331/94.5; 65/30; 252/301.4 R

[56] References Cited

UNITED STATES PATENTS

| | | | |
|---|---|---|---|
| 3,441,517 | 4/1969 | Brauer et al. | 252/520 |
| 3,254,267 | 5/1966 | Sack | 313/69 |
| 3,523,045 | 8/1970 | Suzuki | 148/33.1 |

*Primary Examiner*—Martin H. Edlow
*Attorney*—Glenn H. Bruestle

[57] ABSTRACT

An electroluminescent device includes a layer including a transition metal oxide doped with a trivalent rare earth metal. The transition metal oxide has the general formula, $M_x^I(M^{II}O_y)_z$ where $M^I$ is a Group IIA element or a group IIIB element, $M^{II}$ is a transition metal, O is oxygen and the subscripts $x$, $y$ and $z$ denote the number of each of the elements depending on the valences of the particular elements used. The layer may be in the form of a single crystalline body of the doped transition metal oxide or particles of the transition metal oxide in a dielectric medium. A pair of spaced contacts are provided on the layer. For the single crystalline body one of the contacts is a blocking contact and the other is an ohmic contact. For the layer which includes the particles in a dielectric medium, both contacts are blocking contacts. Light is emitted from the layer when a current is applied through the layer between the contacts; DC current being used for the single crystalline body and AC current for the particles in a dielectric medium.

6 Claims, 2 Drawing Figures

PATENTED APR 17 1973 3,728,594

ELECTROLUMINESCENT DEVICE COMPRISING A TRANSITION METAL OXIDE DOPED WITH A TRIVALENT RARE EARTH ELEMENT

BACKGROUND OF THE INVENTION

The invention herein disclosed was made in the course of or under a contract or subcontract thereunder with the Department of the Army.

The present invention relates to an electroluminescent device in which the active material is a body of a transition metal oxide doped with a rare earth metal.

Solid state electroluminescent diodes have been developed which emit light, either visible or infrared, when biased by an electrical current. Such diodes generally include a body of a single crystalline semiconductor material having regions of opposite conductivity type forming a PN junction therebetween. When the junction is forwardly biased, charge carriers of one type are injected from one of the regions into the other where the predominant charge carriers are of the opposite type. The light is generated through the recombination of the oppositely charged carriers. Such diodes are generally made of the group III-V compound semiconductor materials, such as the phosphides, arsenides and antimonides of aluminum, gallium and indium and combinations of these materials because the high band-gap energy of these materials allows emission of visible and near infrared radiation. These electroluminescent diodes have the advantages of being small in size, being relatively easy to manufacture in large quantities and being capable of being made in integrated arrays to form displays, such as alpha-numeric displays.

Although the transition metal oxides have high luminescent (power and quantum) efficiencies, heretofore these materials have only been made to luminesce by excitation with either ultra-violet light or electrons. Since such luminescent devices require a source of excitation energy, either a device for emitting ultraviolet light or an electron emitter, they are more complex and larger in size than a wholly solid state electroluminescent device. Also, they generally require more energy to achieve luminescence than the solid state electroluminescent devices.

SUMMARY OF THE INVENTION

An electroluminescent device includes a layer including a transition metal oxide having the formula $M_x^i(M^{ii}O_y)_z$ where $M^i$ is a Group IIA element or a Group IIIB element, $M^{ii}$ is a transition metal and O is oxygen. The transition metal oxide is doped with a trivalent rare earth metal and the body is provided with means for applying a current across the body.

DETAILED DESCRIPTION

Figure 1:
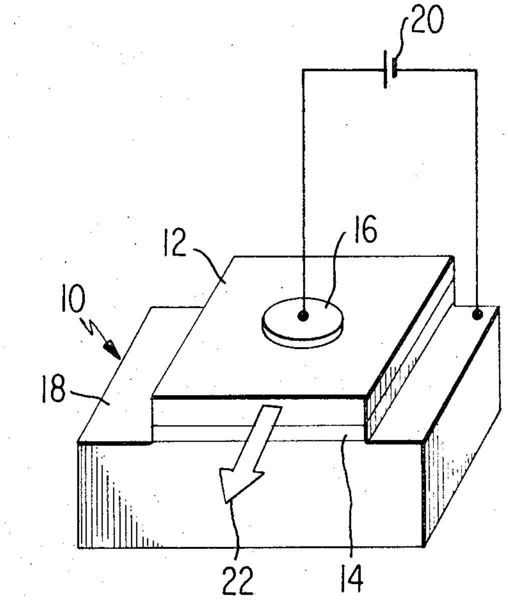
FIG. 1 is a perspective view of one form of the electroluminescent device of the present invention.

Referring initially to FIG. 1 of the drawing, one form of the electroluminescent device of the present invention is generally designated as 10. The electroluminescent device 10 comprises a layer in the form of flat body 12 of a single crystal transition metal oxide which is doped with a trivalent rare earth metal. The transition metal oxide is one having the general formula $$M_x^i(M^{ii}O_y)_z$$

Where: $M^i$ is either a Group IIA element, such as calcium, strontium, magnesium and barium, or a Group IIIB element, such as yttrium and lanthanum;

$M^{ii}$ is a transition metal such as titanium, vanadium, niobium, tungsten, zirconium, molybdenum, hafnium and tantalum;

O is oxygen; and $x$, $y$ and $z$ denote the number of each element involved depending on the valences of the particular elements used.

The rare earth metal with which the transition metal oxide is doped may be praseodymium, neodymium, samarium, europium, terbium, dysprosium, holmium, erbium or thulium. The amount of the rare earth metal in the transition metal oxide may be between 0.01 and 0.5 percent by weight.

A contact 14 is coated on one surface of the body 12. The contact 14 may be of any metal or alloy which will form a good ohmic contact with the body. For example, the contact 14 may be indium or an alloy of indium and gallium. A blocking contact 16 is on the other surface of the body 12. The blocking contact 16 may be of any high work function metal, such as platinum or carbon. As shown, the body 12 is mounted on a block 18 of a good electrical and thermal conducting metal, such as copper.

In the use of the electroluminescent device 10, the contacts 14 and 16 are connected to opposite sides of a source of DC current, such as a battery 20, so as to provide a flow of current through the body 12 between the contacts 14 and 16. At a suitable voltage, luminescence is generated in the body 12 beneath the blocking contact 16 and the luminescence is emitted from the body 12 as indicated by the arrow 22. It has been found that electroluminescence can be achieved with the blocking contact 16 being biased either negative or positive. The wavelength of the emitted light depends on the particular transition metal oxide and the particular rare earth metal dopant used for the body 12. For example, a body 12 of strontium titanium oxide doped with praseodymium ($SrTiO_3$:Pr) and a body of calcium titanium oxide doped with praseodymium ($CaTiO_3$:Pr) each provide an emission of red light. Infrared emission can be obtained from a body of calcium tungsten oxide doped with neodymium ($CaWO_4$:Nd), yellow light emission from yttrium vanadium oxide doped with dysprosium ($YVO_4$:Dy), green light emission from strontium molybdenum oxide doped with terbium ($SrMoO_4$:Tb) and blue light emission from calcium tungsten oxide doped with thulium ($CaWO_4$:Tm). Thus, electroluminescent devices of the present invention can be provided to emit light of wavelengths over a wide range of the spectrum.

To make an electroluminescent device 10 of the present invention, a single crystal of a suitably doped transition metal oxide is grown using any well-known technique. One technique for growing such a crystal is described in U.S. Pat. No. 2,628,156 to L. Merker et al., dated Feb. 10, 1953, entitled "Optically Glass-Like Material." The crystal is formed into bodies of the desired size. The metal of the blocking contact 16 is then coated on the body by any well-known technique, such as by vacuum evaporation. The crystal is then annealed by heating it at a temperature between 750° and 950° C for a period up to 1 hour in a reducing atmosphere, such as in hydrogen or vapors of strontium or magnesium, or in vacuum. The crystal is so annealed to provide an optimum donor concentration which should preferably be in the range of $10^{14}$ to $10^{17}$ per $cm^3$. The metal of the ohmic contact 16 is then coated on the body by any well-known technique, such as by vacuum evaporation. The body is then mounted on the metal block 18 and secured thereto such as by a suitable solder.

The individual electroluminescent devices 10 can be used as individual light sources, such as for warning lights on an instrument panel etc. A plurality of the electroluminescent devices 10 can be arranged in an array to form an illuminated display, such as an alphanumeric display. Also, by providing a large body of the single crystal transition metal oxide having thereon a plurality of spaced blocking contacts arranged in an array, an integrated light display can be provided.

Figure 2:
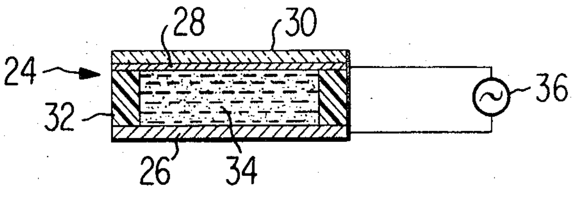
FIG. 2 is a sectional view of another form of the electroluminescent device.

Referring to FIG. 2, another form of the electroluminescent device of the present invention is generally designated as 24. The electroluminescent device 24 comprises a pair of spaced contacts 26 and 28. As shown, the contact 26 is a plate of an electrically conductive metal, such as aluminum and the contact 28 is a transparent film of an electrically conductive material, such as tin oxide, on the surface of a glass plate 30. The contacts 26 and 28 are secured together in spaced relation by a wall 32 of an electrical insulating material, such as a ceramic. The contacts 26 and 28 and the wall 32 form an enclosed space which is completely filled with a layer 34 of particles of the doped transition metal oxide dispersed in a dielectric medium, such as castor oil. The amount of the dielectric medium used in the layer 34 is preferably just enough to form a thick slurry of the particles. The particles of the doped transition metal oxide are preferably annealed by heating at a temperature of between 750° and 950° C for a period up to 1 hour in a reducing atmosphere to provide an optimum donor concentration which should preferably be in the range of $10^{14}$ to $10^{17}$ per $cm^3$.

In the use of the electroluminescent device 24, the contacts 26 and 28 are connected to a source of AC current 36 so as to provide an AC field across the layer 34. At a suitable voltage, luminescence is generated in the layer 34 which can be seen through the glass plate 30 and the transparent contact 28. For an electroluminescent device 24 in which the layer 34, 4 mils thick, contained particles of strontium titanium oxide doped with praseodymin ($SrT_iO_3$:Pr), red light was emitted in an AC field in excess of $10^4$V/cm, which was established by applying approximately 300 volts AC across the layer 34 between the contacts 26 and 28.

We claim:

1. An electroluminescent device comprising:

a. a single crystalline layer of a transition metal oxide having the formula:

$$M^{i}_{x}(M^{ii}O_{y})_{z}$$

wherein $M^i$ is an element selected from the group consisting of Group IIA elements and Group IIIB elements;

$M^{ii}$ is a transition metal;

O is oxygen;

$x$ denotes the number of $M^i$ atoms, $z$ denotes the number of $M^{ii}$ atoms, $y$ times z denotes the number of O atoms, with $x$, $y$, and $z$ being chosen depending on the valences of the particular elements used, said layer having an N type conductivity with a donor concentration of from $10^{14}$ to $10^{17}$ per $cm^3$;

b. a dopant of a trivalent rare earth metal; and c. a pair of spaced contacts on said layer.

2. An electroluminescent device in accordance with claim 1 in which one of said contacts is a blocking contact.

3. An electroluminescent device in accordance with claim 1 in which $M^i$ is a metal selected from the group consisting of calcium, strontium, magnesium, barium, yttrium and lanthanum.

4. An electroluminescent device in accordance with claim 3 in which $M^{ii}$ is a transition metal selected from the group consisting of titanium, vanadium, niobium, tungsten, zirconium, molybdenum, hafnium and tantalum.

5. An electroluminescent device in accordance with claim 4 in which the rare earth metal is selected from the group consisting of praseodymium, neodymium, samarium, europium, terbium, dysprosium, holmium, erbium and thulium.

6. An electroluminescent device in accordance with claim 5 in which the amount of the rare earth metal in the body is between 0.01 and 0.5 percent by weight.

* * * * *